Patented Feb. 24, 1948

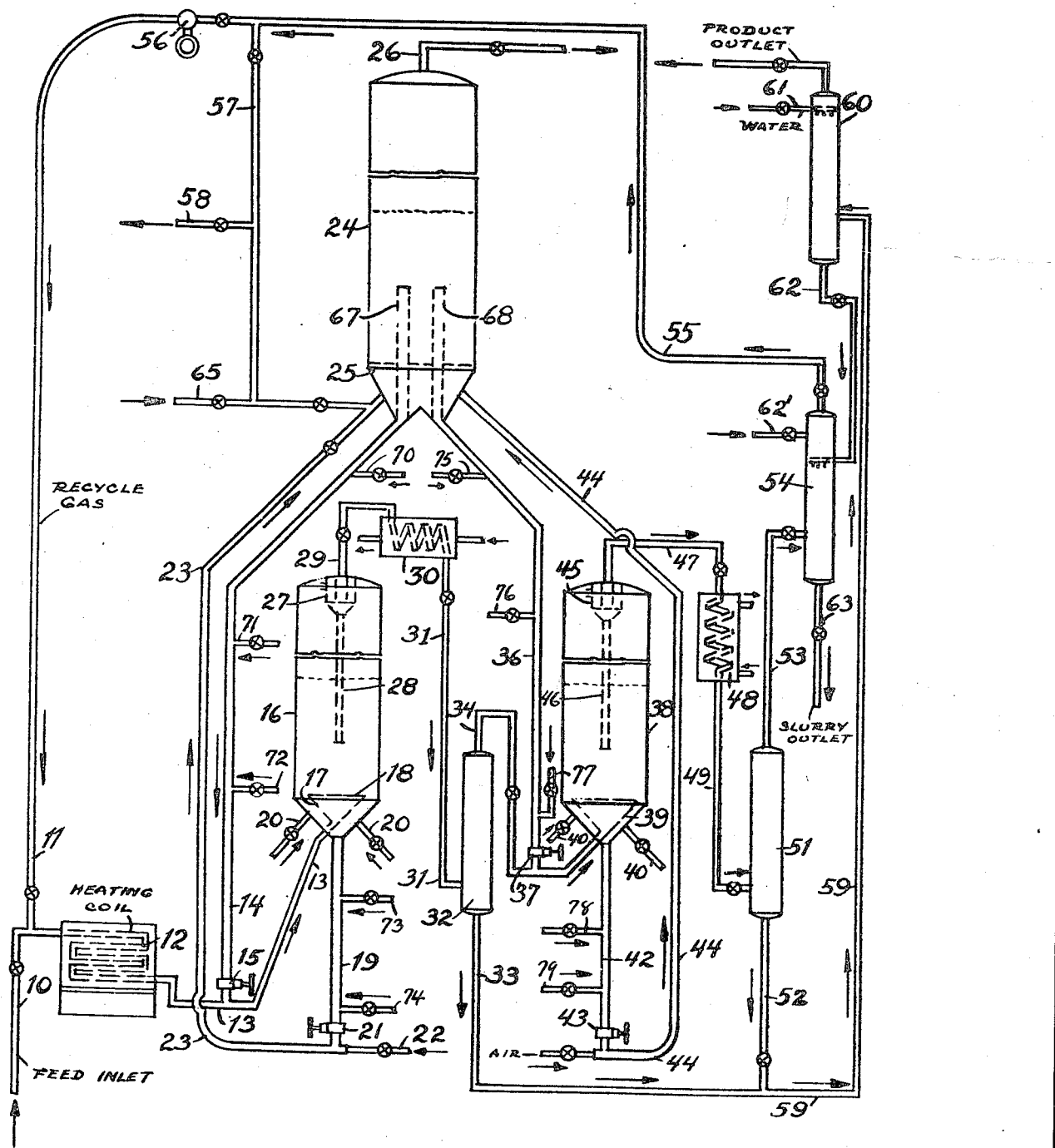

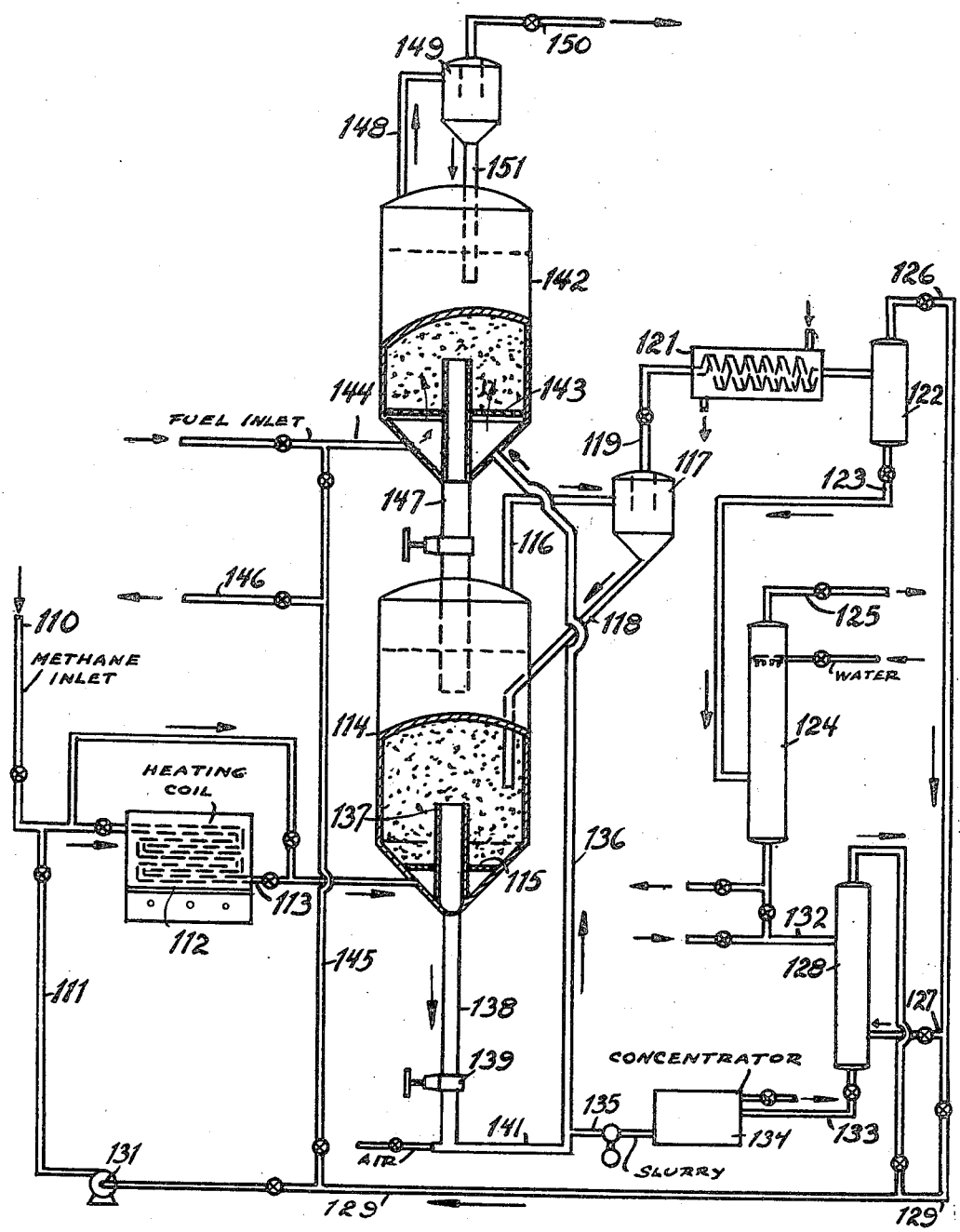
FIG.-II

2,436,595

UNITED STATES PATENT OFFICE 2,436,595

CONVERSION OF HYDROCARBON GASES

Edward W. S. Nicholson and Aaron K. Redcay, Baton Rouge, La., assignors to Standard Oil Development Company, a corporation of Delaware Application November 19, 1943, Serial No. 510,872

2 Claims. (Cl. 260—666)

This invention relates to the treatment of hydrocarbon gases and pertains more particularly to the conversion of methane, ethane, and lower boiling hydrocarbon gases into higher molecular weight hydrocarbons.

It has previously been found that methane can be converted into higher molecular weight hydrocarbons by combination of dehydrogenation and polymerization reactions. The procedure involves contacting the methane with a catalyst such as iron oxide supported on a carrier at a temperature of 1500° F. The reaction is highly endothermic, requiring a large heat input in order to maintain the reaction. Furthermore, the catalyst rapidly becomes contaminated with tarry carbonaceous deposits which destroy the activity.

It has heretofore been proposed to carry out the reaction in a series of successive steps with intermediate reheating and separation of the liquid hydrocarbon products between the individual steps.

One of the principal objects of the present invention is to provide an improved continuous process for converting methane, ethane, and other low molecular weight hydrocarbon gases into higher molecular weight hydrocarbon oils.

A further object of the invention is to provide a process for converting such gases into oils in which the required temperature is more readily controlled and more evenly maintained.

Other more detailed objects of the invention will be apparent from the disclosures hereinafter.

For a better understanding of the invention reference is now made to the accompanying drawings wherein:

Fig. 1 is a diagrammatic illustration of an apparatus capable of carrying the invention into effect, and Fig. 2 is a similar view of a more simple form of apparatus capable of carrying out the invention.

Referring particularly to Fig. 1, the reference character 10 designates a feed line through which the methane, ethane, or low molecular weight hydrocarbon gases are introduced into the equipment.

The hydrocarbon gas feed introduced through line 10 is preferably intermixed with a recycle gas passing through line 11. The resulting mixture is thereafter passed through a preheating furnace 12 wherein the mixture is heated to the desired temperature. The heated products are then transferred through line 13 into which a stream of highly heated finely divided catalyst is introduced through a vertical pipe or conduit 14 having a control valve 15 for regulating the amount of catalytic material so introduced. The temperature of the catalyst at the time of mixing with the hydrocarbon gases is preferably materially above the temperature desired for the reaction. For example, the temperature of the hot catalyst may be of the order of from 1600° F. to 1900° F. The amount of catalyst introduced into the gas stream will depend upon the temperature of the reaction and the temperature of the hydrocarbon gases at the point of mixing with the catalyst. The proportion of hot catalyst introduced into the gas stream is controlled to form an equilibrium temperature somewhat above the final desired reaction temperature. When preheating the initial feed in the furnace 12 to a temperature about 1000° F., the amount of catalyst so introduced may be of the order of from 5 to 50 parts per part of gas by weight.

The catalyst introduced into the gas stream may comprise an oxide or other compounds of the metals of groups VI and VIII of the periodic system, preferably supported on suitable inert carriers such as silica gel, alumina, and the like. One particularly suitable catalyst comprises iron oxide supported on silica gel or alumina. Furthermore, a heat-carrying diluent may be intermixed with the catalyst discharging into the gas stream.

The resulting suspension of catalyst and hydrocarbon vapors formed in the transfer line 13 is passed into the base of a reaction chamber 16 preferably through a distributing cone 17 having a perforated grid 18 at the top thereof. The suspension passes upwardly through the perforations in the grid into the main body of the reaction chamber.

The hydrocarbon gas is preferably passed upwardly through the catalyst chamber at a velocity controlled to cause the catalyst to segregate into a relatively dense layer in the bottom portion of the reaction chamber as illustrated on the drawing.

The distributing cone 17 is preferably spaced from the outer walls of the catalyst chamber 16 to form an annular space for continuous withdrawal of the catalyst from the chamber. The catalyst so withdrawn is discharged into a vertical pipe 19 connected with the bottom of the catalyst chamber. If desired, a stripping gas such as steam, spent combustion gases or the like may be introduced into the annular space through line 20 for removing valuable reaction products from the catalyst withdrawn from said chamber. The catalyst withdrawn from the chamber 16 through pipe 19 is discharged at a controlled rate through valve 21 into a stream of air passing through line 22. The suspension of air and catalyst is then passed through line 23 into the base of a regenerating chamber 24 below a perforated grid 25 located in the bottom portion of the chamber.

The catalyst-air suspension passes upwardly through the perforated grid into the main body of the regenerating chamber 24 and the upper velocity of the regeneration air is also controlled to cause the bulk of the catalyst to segregate into a relatively dense layer in the bottom of the regenerator 24.

Spent combustion gas is removed from the regeneration chamber 24 through line 26 and may be passed to suitable dust separating and heat recovery equipment which, for purposes of simplicity, has not been shown in the drawing.

The catalyst withdrawn from the catalyst chamber 16 contains a substantial amount of combustible deposits which are burned by the air in regeneration chamber 24 thereby heating the catalyst to a temperature above the temperature maintained in the catalyst chamber 16.

Returning again to the catalyst chamber 16, the hydrocarbon gases pass upwardly through the chamber at a controlled rate previously described and the time of residence of the gases with the catalyst is controlled to convert a substantial portion of the gases into normally liquid hydrocarbons.

The gaseous reaction products after passing through the catalyst chamber 16 may be passed into a cyclone separator 27 positioned in the upper end of the chamber 16. Catalyst separated from the vapors in the separator 27 may be returned to the lower end of the reactor below the level of the catalyst therein by the pipe 28.

The gaseous reaction products after passing through the separator 27 are removed from the reaction chamber through line 29 and may be passed to a cooler 30 in which the temperature is reduced to condense the normally liquid hydrocarbons.

The products from the cooler 30 are then passed through line 31 to a product separator 32 in which the liquid condensate is allowed to separate from uncondensed gases. The liquid condensate comprising the liquid hydrocarbons and a small amount of entrained catalyst is removed from the bottom of the separator 32 through line 33 and is treated as hereinafter described.

Gaseous products separated in the separator 32 are removed therefrom through line 34 into which a second stream of hot finely divided catalyst is discharged through vertical pipe 36 having a control valve 37 for regulating the rate of flow of the catalyst into the gas. The catalyst passing through the pipe 36 into the gas stream is regenerated catalyst removed from the regenerator 24 and is at a temperature materially above the desired reaction temperature.

The amount of catalyst so introduced is sufficient to heat the resulting suspension to an equilibrium temperature somewhat above the final desired reaction temperature.

The suspension of hot catalyst and gas formed in the line 34 then continues to a second catalyst chamber 38 having a construction similar to the catalyst chamber 16.

The suspension passes into the chamber through a distributing cone 39 having a perforated grid through which the catalyst passes into the main body of the catalyst chamber. The vertical velocity of the gases passing upwardly through the chamber 38 is also controlled to cause the bulk of the catalyst to segregate into a relatively dense layer in the bottom section of the chamber as illustrated in Fig. 1.

The distributing cone 39 is spaced from the outer walls of the chamber 38 to form an annular space through which the catalyst is continuously withdrawn from the chamber. A stripping gas may be introduced into the annular space through line 40 for removing valuable products absorbed or otherwise contained on the catalyst so withdrawn as previously described in connection with chamber 16. The catalyst so withdrawn discharges into a vertical pipe or conduit 42 having control valve 43 for feeding the catalyst into a stream of air passing through line 44. The suspension passes through line 44 into the base of regenerator 24 below the perforated grid 25 and intermixes with the catalyst withdrawn from the initial catalyst chamber 16. The regeneration chamber 24 serves to regenerate the catalyst withdrawn from both the catalyst chamber 16 and the catalyst chamber 38.

The gases passing upwardly through the catalyst chamber 38 are contacted with the catalyst to convert an additional portion thereof into liquid hydrocarbons.

The conversion products are then passed into a cyclone separator 45 or other suitable separator device which may be located in the upper end of the converter for removal of entrained catalyst from the reaction products. The catalyst separated discharges back into the bottom portion through the conduit 46.

The reaction products from the second catalytic converter 38 are withdrawn therefrom through line 47 and passed to a cooler 48 in which the products are again cooled to a temperature sufficient to condense the normally liquid hydrocarbons formed in the operation.

The products from the cooler 48 are then transferred through line 49 into a product separator 51 in which the liquid condensate is separated from the gaseous hydrocarbons. The liquid condensate, which may contain a small amount of entrained catalyst, is withdrawn from separator 51 through line 52 and is treated as later described.

The gases separated from the liquid product in the separator 51 are withdrawn overhead therefrom through line 53.

Fig. 1 illustrates two successive stages for treating the gas for the formation of the higher molecular weight hydrocarbon oils. In some cases, however, it may be desirable to provide additional stages similar to those shown in Fig. 1 for effecting further conversion.

The gaseous products removed from the separator 51 through line 53 are passed into a water scrubber 54 in which they are contacted with water to scrub any entrained catalyst which may be contained therein. The scrubbed gases are then removed from the water scrubber 54 through line 55. These gases may be repressured by compressor 56 and recycled for further conversion. In some cases it is desirable to pass a part or all of this gas into the regenerator 24 to serve as a fuel for heating catalyst therein. To this end a part or all of the gas may be passed through line 57 into the regenerator 24. If desired, a portion of the recycle gas may be withdrawn from the system through line 58.

Returning again to the liquid products removed from the separator 32 and separator 51 through lines 33 and 52, respectively, these condensates are combined in line 59 and passed to a water scrubber 60 in which they are scrubbed to remove entrained catalyst contained therein. Water for scrubbing may be introduced into the scrubber 60 through line 61. The water is removed from the bottom of the scrubber 60 through line 62 and is injected into the water scrubber 54 through which the gaseous reaction products pass as previously described. If desired, additional water may be introduced into the water scrubber 54 through line 62. The water containing the entrained catalyst removed from the gases and liquid products is removed from the bottom of the scrubber 54 through line 63. This water slurry may be passed into a suitable concentrator such as a filter, settling chamber, thickener, or the like for increasing the concentration of the catalyst. The resulting slurry may then be passed into the regeneration chamber 24 through a suitable line which, for simplicity, has not been shown on the drawing.

The regeneration chamber 24 not only serves to remove the combustible deposits formed on the catalyst during the process but also serves to supply the heat required for the process. In many cases the amount of heat for carrying out the operation may be obtained by burning the combustible deposits contained on the catalyst in the regeneration chamber 24. In other cases additional fuel may be supplied. As previously mentioned, this fuel may comprise tail gas from line 55, or an extraneous fuel may be introduced through line 65. The catalyst is regenerated in the chamber 24 and heated to a temperature materially above the temperature maintained in the catalyst chambers 16 and 38. The regeneration may be carried out, for example, at a temperature of 1600° F. to 1900° F. The catalyst is continuously withdrawn from the regeneration chamber 24 through the vertical pipes 14 and 36 discharging into transfer lines 13 and 34, respectively. The conduits 14 and 36 may have extensions 67 and 68 projecting upwardly through the perforated grid 25 into the main body of the regeneration chamber below the dense layer of catalyst maintained therein. The catalyst is continuously returned to the gas streams while at substantially regeneration temperature and the rate of circulation of the catalyst through the regeneration or reaction chambers is controlled to supply the heat required for the process.

In order to cause the catalyst to circulate continuously through the catalyst chamber or regeneration chamber as previously described, it is necessary to continuously restore the pressure on the catalyst which is lost during circulation. This pressure may be restored by constructing the vertical conduits 14 and 36 and the vertical conduits 19 and 42 of heights which will generate a fluid pressure at the base thereof sufficient to overcome the pressure drop through the system. In order for the catalyst in the various vertical tubes to generate such a pressure it is necessary that they be maintained in a fluid state. This is accomplished by keeping a small amount of an aerating or fluidizing gas in admixture with the catalyst during its passage through the column. It has been observed that under such circumstances the catalyst powder behaves as a liquid and is capable of generating fluid pressures.

In order to maintain the catalyst in the various columns just mentioned in a fluid state an aerating or fluidizing gas may be introduced at one or more spaced points along the columns 14, 19, 36 and 42 through lines 70 to 72, 73 and 74, 75 to 77 and 78 and 79, respectively, as illustrated in the drawing.

The process above described is preferably carried out at atmospheric pressure, although a mild superatmospheric pressure of the order of 100 pounds per square inch may be employed.

Fig. 1 shows a two-stage process for converting methane into liquid hydrocarbons in which the process is carried out in the presence of a finely divided catalyst which is continuously circulated through the reaction chamber and a heating chamber which also serves as a regeneration chamber so that the heat for the process is supplied by the heat generated in the regenerator 24.

Fig. 2 shows a modified form of the invention in which the operation is carried out in a single stage rather than a plurality of stages as indicated in Fig. 1.

Referring to Fig. 2, numeral 110 denotes a feed line for introducing the methane or other low boiling hydrocarbon into the equipment. The methane introduced through line 110 is intermixed with recycle gas passing through line 111 and the resulting mixture is thereafter passed to a heating furnace 112.

The heated products are then discharged through line 113 into the base of the reaction chamber 114. A perforated grid 115 may be provided adjacent the bottom of the reaction chamber 114 to form a distributing zone for the gases to be reacted.

The gases pass upwardly through the grid into the main body of the reaction chamber which contains a mass of finely divided catalyst of the type heretofore described. The velocity of the gases passing through the grid is sufficient to prevent settling of the powder in the distributing zone beneath the grid.

The velocity of the gases to be reacted passing upwardly through the reaction chamber 114 is controlled to maintain the mass of catalyst therein in a liquidized turbulent state as previously described in connection with Fig. 1.

The reaction chamber 114 may be maintained at a temperature of from 1300° F. to 1800° F. and the time of contact of the gases with the catalyst is controlled to convert a portion thereof into liquid hydrocarbons.

The reaction products are withdrawn from the chamber 114 through line 116 which leads to a cyclone separator 117 or similar separating device for removing entrained powder contained therein. The powder separated in the separator 117 is returned to the reaction chamber 114 through line 118. The gases are removed from the cyclone separator through line 119 and passed through a cooler 121 in which they are cooled to a temperature sufficient to condense the liquid hydrocarbons formed in the reaction.

The products from the cooler 121 then pass to a separator 122 wherein liquid condensate is separated from uncondensed gases. The liquid condensate collected in the separator 122 is withdrawn through line 123 and passed to a water scrubber 124 where it is treated to remove entrained catalyst contained therein as previously described with reference to Fig. 1. The liquid product is withdrawn from the scrubber through line 125.

Unreacted gas separated in the separator 122 is removed therefrom through line 126 and may be passed through line 127 to a water scrubber 128 for removing entrained powder or the gas may be passed directly through line 129 and compressor 131 to the inlet side of the furnace 112 as previously described. When subjecting the gases to water scrubbing the water is introduced into the scrubber 128 through line 132. This water may be fresh cleanup water or it may be that withdrawn from the bottom of the scrubbing chamber 124 employed for scrubbing the liquid condensate. The water containing the catalyst is withdrawn from the water scrubber 128 through line 133 and may be passed to suitable concentrating equipment 134, such as a settler, filter, thickener, or the like. The resulting catalyst separated in the concentrator may be passed through line 135 and passed to the regenerator through line 136.

Catalyst is continuously withdrawn from the reactor 114 through a vertical tube 137 extending upwardly into the main body of the reactor. The tube 137 connects at its bottom end with a vertical pipe or conduit 138 having control valve 139 through which the catalyst discharges into a stream of air passing through line 141 and line 136, respectively. The suspension of catalyst and air formed in line 141 is passed through line 136 to a regenerator 142 positioned above the reaction chamber 114.

The regenerator 142 is of the same general construction as the reaction chamber 114. The catalyst-air suspension is introduced into the base of the regenerator and passes upwardly through a perforated grid 143 into the reaction chamber. The velocity of the air passing through the regenerator is controlled to form a dense fluidized layer of catalyst in the bottom portion thereof as previously described.

The catalyst within the regenerator 142 is heated to a temperature materially above the temperature existing in the reaction chamber 114. This heat may be supplied in some cases merely by oxidation of combustible deposits contained on the catalyst introduced into the regenerator. In other cases it may be necessary to supply additional fuel in the form of oil, gas or the like. This fuel may be introduced into the regenerator through line 144. This fuel may be obtained from an extraneous source, or it may comprise tail gases, or all of the tail gas passing through line 129 may be passed through line 145. Excess tail gas not employed as fuel or recycled for further treatment may be withdrawn from the system through line 146.

The hot regenerated catalyst is continuously discharged from the regenerator 142 through the vertical conduit 147 into the reaction chamber 114 below the surface of the catalyst layer contained therein.

The rate of circulation of catalyst through the regenerator and treating zone is controlled to supply the required heat for carrying out the process.

Spent regeneration gases from the regenerator 142 are removed overhead through line 148 and passed to a cyclone separator 149 or other suitable separating device for removal of the entrained powder therefrom. The gas after being completely separated from the catalyst is vented from the system through line 150. The catalyst separated in the separator 149 is returned to the regenerator through line 151.

In both Figs. 1 and 2 indirect coolers 30, 48 and 121 are shown for cooling the reaction products withdrawn from the treating chamber. In some cases, however, it may be desirable to inject a quenching liquid such as an oil or water into the reaction products to cool the products to the required temperature.

Having described the preferred embodiment of the invention, it will be understood that it embraces such other variations and modifications as come within the spirit and scope thereof.

We claim:

1. The process for converting methane into higher boiling hydrocarbons which comprises passing methane to be converted through a conversion zone containing a body of finely divided dehydropolymerizing catalyst, continuously withdrawing catalyst from said conversion zone, passing the catalyst so withdrawn to a regeneration zone, removing combustible deposits contained on said catalyst by burning within said regeneration zone to regenerate and heat the catalyst, continuously returning hot regenerated catalyst to said conversion zone, maintaining the conversion zone at an active conversion temperature of between about 1400° F. and 1600° F., maintaining said gas in contact with said catalyst for a period sufficient to convert a portion thereof into higher boiling normally liquid hydrocarbons, thereafter withdrawing gaseous conversion products from the conversion zone, cooling said gases to condense higher boiling normally liquid hydrocarbons formed in said conversion zone, separating the condensate from unreacted gaseous product, passing the unreacted gaseous product to a second conversion zone separate and independent of said first-named conversion zone, contacting the gaseous product in the second-named conversion zone with a finely divided dehydropolymerizing catalyst, continuously withdrawing catalyst from said second-named conversion zone, passing catalyst so withdrawn to said regeneration zone for removing combustible deposits formed thereon, continuously returning regenerated catalyst from said regeneration zone to said second-named conversion zone, maintaining gaseous products in said second conversion zone for a period sufficient to convert a further portion of said gases into higher boiling hydrocarbons, thereafter removing reaction products from the second conversion zone and segregating a higher boiling hydrocarbon fraction therefrom.

2. A process for converting hydrocarbon gases into higher boiling normally liquid hydrocarbons which comprises passing a stream of hydrocarbon fluid consisting essentially of gas to be reacted upwardly through a conversion zone containing a layer of finely divided catalyst, controlling the velocity of the gas passing upwardly through the layer to maintain said layer in a dense fluid state, continuously withdrawing catalyst from the conversion zone, intermixing the catalyst so withdrawn with a stream of air, passing the resulting mixture upwardly through a regeneration zone, controlling the velocity of the gases passing through the regeneration zone to cause said catalyst to separate into a relatively dense turbulent layer within said regeneration zone, removing combustible deposits from the catalyst within said regeneration zone by burning and thereby heating said catalyst therein to a temperature materially above the temperature in the conversion zone, returning at least part of the regenerated catalyst while in said heated condition to said conversion zone, maintaining the gas in contact with the catalyst within the conversion zone for a period sufficient to convert a substantial portion thereof into higher boiling normally liquid hydrocarbons by an endothermic reaction, thereafter removing the reaction products from the conversion zone, segregating the products withdrawn from the conversion zone to separate the higher boiling hydrocarbons formed therein from unreacted gas and passing the separated unreacted gas to a second separate conversion zone and contacting it therein with hot regenerated catalyst particles from said regeneration zone, said hot regenerated particles being at a temperature materially above the temperature in said second conversion zone to supply heat of reaction thereto, said catalyst particles in said second conversion zone being maintained in a dense turbulent layer.

EDWARD W. S. NICHOLSON.
AARON K. REDCAY.

REFERENCES CITED

The following references are of record in the file of this patent:

UNITED STATES PATENTS

| Number | Name | Date |
|---|---|---|
| 1,687,890 | Ramage | Oct. 16, 1928 |
| 1,847,240 | Frey | Mar. 1, 1932 |
| 1,988,873 | Linckh | Jan. 22, 1935 |
| 2,116,157 | Morrell | May 3, 1938 |
| 2,123,799 | Podbielniak | July 12, 1938 |
| 2,138,541 | Frey | Nov. 29, 1938 |
| 2,176,354 | Nelson | Oct. 17, 1939 |
| 2,231,231 | Subkow | Feb. 11, 1941 |
| 2,245,733 | Subkow | June 17, 1941 |
| 2,253,486 | Belchetz | Aug. 19, 1941 |
| 2,289,329 | Prickett | July 7, 1942 |
| 2,303,680 | Brueckmann | Dec. 1, 1942 |
| 2,322,019 | Hemminger | June 15, 1943 |
| 2,325,516 | Holt | July 27, 1943 |
| 2,334,583 | Reeves | Nov. 16, 1943 |
| 2,337,684 | Scheineman | Dec. 28, 1943 |
| 2,354,261 | Hemminger | July 25, 1944 |
| 2,376,190 | Roetheli et al. | May 15, 1945 |

FOREIGN PATENTS

| Number | Country | Date |
|---|---|---|
| 115,689 | Australia | Aug. 6, 1942 |